United States Patent [19]

Murakami et al.

[11] 3,867,414

[45] Feb. 18, 1975

[54] PROCESS FOR THE PREPARATION OF SUSPENSIONS OF MICROCRYSTALS OF CHLORAMPHENICOL PALMITATE

[75] Inventors: Masuo Murakami; Ryuichi Kawata, both of Tokyo; Shigeo Kawamura, Urawa; Shuichi Takamura, Ageo; Takayoshi Hirano; Kouji Tomuro, both of Tokyo, all of Japan

[73] Assignee: Yamanouchi Pharmaceutical Co., Ltd., Tokyo, Japan

[22] Filed: Apr. 6, 1973

[21] Appl. No.: 348,667

Related U.S. Application Data

[63] Continuation of Ser. No. 90,822, Nov. 18, 1970, abandoned.

[30] Foreign Application Priority Data

Dec. 6, 1969 Japan.............................. 44-97310

[52] U.S. Cl.............................. 260/404.5, 424/312

[51] Int. Cl............................................ A61k 21/00
[58] Field of Search .......... 424/324, 312; 260/404.5

[56] References Cited
UNITED STATES PATENTS 3,702,364    11/1972    Boghosian et al. ................. 424/324

OTHER PUBLICATIONS

Chemical Abstracts, Vol. 71, (1969), p. 94718f.
Martin, E., "Pharmaceutical Dispensing" (1966), p. 238.

*Primary Examiner*—Vincent D. Turner

[57] ABSTRACT

The process for preparing a suspension of the microcrystals of chloramphenicol palmitate by mix-melting chloramphenicol palmitate and a nonionic surface active agent, solidifying the molten mixture by quenching, and then dispersing the solidified mixture in a suspension medium by means of a colloid mill.

5 Claims, No Drawings

PROCESS FOR THE PREPARATION OF SUSPENSIONS OF MICROCRYSTALS OF CHLORAMPHENICOL PALMITATE

The present application is a continuation of Applicants' copending application Ser. No. 90,822 filed on Nov. 18, 1970 and now abandoned.

DETAILED EXPLANATION OF THE INVENTION

The present invention relates to a process for the preparation of a suspension of the microcrystals of chloramphenicol palmitate and more particularly it relates to a process for the preparation of a suspension of the microcrystals of chloramphenicol palmitate by mix-melting chloramphenicol palmitate and a nonionic surface active agent, solidifying the mixture by quenching, and then dispersing the solidified mixture by means of a colloid mill.

Since chloramphenicol palmitate has not a bitter taste, it is suitable for oral administration but since it is scarcely dissolved in water, it is used as a suspension thereof. The chloramphenicol palmitate orally administrated is hydrolyzed in the intestinal tract to form chloramphenicol, which is absorbed at the intestinal tract.

Now, if the shape or the size of the crystals of chloramphenicol palmitate are inadequate, a homogenous and stable suspension of chloramphenicol palmitate cannot be obtained as well as the hydrolysis of the chloramphenicol palmitate is not smoothly conducted in the intestinal tract. Thus, in such a case, an effective blood level of chloramphenicol cannot be obtained.

As the crystals of chloramphenicol palmitate, there are known the three kinds of crystals, that is a thermally stable A-type crystal (it is also called "β-form") prepared by cooling slowly a solution of chloramphenicol palmitate in a solvent such as methanol or molten chloramphenicol palmitate, a thermally unstable B-type crystal (it is called "α-form") prepared by cooling rapidly the solution of chloramphenicol palmitate or the molten chloramphenicol palmitate, and a thermally most unstable amorphous crystal prepared by cooling the solution or the molten compound more rapidly than the case of producing the B-type crystal (cf.; FDA Regulation; 21, (1) 205; Yakugaku Zasshi, 81, 755-767(1961), Takamine Kenkyusho Nenpo (Annual Report of Takamine Research Institute), 11, 84-88, and Japanese Patent Publication No. 5798/'60).

Among the three types of the crystals, the A-type crystal of chloramphenicol palmitate is thermally stable and hence the solubility in water is low and also the rate of solution is low. Accordingly, the crystal is less hydrolyzed in intestinal tract, the absorption of chloramphenicol at the intestinal tract is less, and hence the effective blood level is not increased. Furthermore, even if the crystal is finely pulverized, it is impossible to reduce the size of the crystal less than about 5 microns from the property of the crystal and the effective blood level is scarecely increased.

The amorphous crystal of chloramphenicol palmitate is thermally very unstable and hence cannot be used for practical purposes.

On the other hand, since the B-type crystal of chloramphenicol palmitate is thermally unstable as compared with the A-type crystal, the solubility thereof in water is high and the rate of solution is high. Accordingly, the B-type crystal is readily hydrolyzed in an intestinal tract and hence chloramphenicol is well absorbed at the intestinal tract and the effective blood level becomes high.

However, the B-type crystal prepared by a conventional manner, e.g., by the method disclosed in the specification of Japanese Patent Publication No. 5798/'60 in which the B-type crystal is prepared by dissolving chloramphenicol palmitate in a hydrophilic organic solvent and cooling rapidly the solution, is not sufficiently fine and hence it is difficult to prepare a suspension of the crystal as it is. The B-type crystal obtained by such a conventional manner may be fined by an ordinally fining manner such as pulverization to an extent of making a suspension thereof but by such a manner the attainable fine size of the crystal is about 2 – 3 microns. By such extent of fineness, the crystal is not yet rapidly hydrolyzed in the intestinal tract and hence sufficiently effective blood level cannot be obtained.

Now, as the results of inventors' investigations, it has been discovered that by mix-melting chloramphenicol palmitate and a nonionic surface active agent, solidifying the mixture by quenching or cooling rapidly, and dispersing the solidified mixture in a suspension medium by means of a colloid mill, a suspension of the very fine B-type crystal (less than 0.5 microns) of chloramphenicol palmitate can be produced.

However, it is impossible to obtain the suspension of such fine crystal of chloramphenicol palmitate by melting chloramphenicol palmitate, solidifying it by quenching, and then dispersing the solidified compound in a suspension medium or a suspension medium containing a surface active agent.

Therefore, the fact that the suspension of the very fine crystals of chloramphenicol palmitate is obtained by the process of this invention is utterly unexpected by such conventional technique.

Since the crystal of chloramphenicol palmitate in the suspension obtained by the process of this invention is greatly finer than the crystal of chloramphenicol palmitate in a suspension obtained by pulverizing the B-type crystal by a conventional manner, an effective blood level higher than that by a conventional suspension can be obtained by an oral administration.

Any liquid or solid nonionic surface active agent which can be mixed and molten with chloramphenicol palmitate by heating can be used as the nonionic surface active agent in this invention. For example, nonionic surface active agents having a HLB value of 13.0 – 16.5 are used in the invention. Typical examples of the surface active agents are a polyoxyethylene ($n = 15 – 30$) higher fatty acid ($C_{12} – C_{18}$) ester such as polyoxyethylene stearic acid ester; a polyoxyethylene ($n = 10 – 25$) sorbitan higher fatty acid ($C_{12} – C_{18}$) ester such as polyoxyethylene sorbitan monostearic acid ester, polyoxyethylene sorbitan monooleic acid ester, polyoxyethylene sorbitan monopalmitic acid ester, etc.; a polyoxyethylene ($n = 10 – 20$) polyoxypropylene ($m = 1 – 4$) higher alcohol ($C_{12} – C_{18}$) ether such as polyoxyethylene polyoxypropylene cetyl alcohol ether; a polyoxyethylene ($n = 15 – 30$) alkyl ($C_8 – C_{10}$) aryl ether such as polyoxyethylene nonylphenyl ether; and a polyoxyethylene ($n = 50 – 80$) hardened castor oil. In the above compounds, $n$ represents a mean polymerization degree of ethyleneoxide and $m$ represents a mean polymerization degree of propyleneoxide.

The amount of the surface active agent is suitably 3 – 10 percent by weight of chloramphenicol palmitate.

As the suspension medium, there are illustrated water, an aqueous solution of sodium carboxymethyl cellulose and an aqueous solution of methyl cellulose. Also, an attrition type colloid mill is suitably used as the colloid mill in this invention and a typical colloid mill of such type is a Premier-type colloid mill.

At the practice of this invention, chloramphenicol palmitate and the nonionic surface active agent are mix-melted by heating, the molten mixture is then solidified by being quenched to provide a waxy solid material, the waxy solid material is pulverized by, for example, a mortar, the pulverized material is added to the suspension medium, and after heating if necessary, the mixture is dispersed by means of a colloid mill.

The quenching of the molten mixture is conducted by cooling it rapidly to temperatures of lower than 10°C. Also, in the case of heating the suspension to be processed by a colloid mill, it is preferable to heat to 30° - 70°C, preferably 40° - 60°C.

Furthermore, instead of adding the suspension medium the solidified mixture prepared by quenching the molten mixture as mentioned above, the process of this invention can be practiced by adding the molten mixture directly into the suspension medium cooled to temperature of, preferably lower than 5°C and then dispersing the mixture by means of a colloid mill.

To the suspension of chloramphenicol palmitate obtained by the process of this invention may added additives usually employed in an ordinary method of producing suspensions, for example, a saccharose such as sucrose, glucose, and levulose; a perfume such as a strawberry oil, cherry essence and silk flavor; and a preservative such as p-hydroxybenzoic acid methyl ester and p-hydroxybenzoic acid propyl ester. In addition, such additives may be preliminary added to the suspension medium before the solidified mixture is added thereto.

The invention is described by the following examples although the invention shall not be limited to them.

EXAMPLE 1

A mixture of 60.0g of chloramphenicol palmitate and 3.0g of polyoxyethylene ($n = 20$) sorbitan stearate was melted and the molten mixture was quenched to 8°C to provide solid material which was pulverized by means of a mortar and added to 1 liter of water. The aqueous mixture was heated to 50°C and then dispersed by means of an attrition type colloid mill to provide a suspension of the fine crystals of chloramphenicol palmitate having the size of less than 0.5 microns.

EXAMPLE 2

A mixture of 60.0g of chloramphenicol palmitate and 2.7g of polyoxyethylene ($n = 25$) stearate was melted and the molten mixture was quenched to 5°C to provide a solid material, which was pulverized in a mortar and added in 1 liter of water. The aqueous mixture was heated to 55°C and then dispersed by means of a colloid mill to provide a suspension of the fine crystals of chloramphenicol palmitate having the size of less than 0.5 microns.

EXAMPLE 3

A mixture of 50.0g of chloramphenicol palmitate and 3.5g of polyoxyethylene ($n = 20$) sorbitan palmitate was melted and then the molten mixture was quenched to 5°C to provide a solid material, which was pulverized by means of a mortar and added to 1 liter of water. By dispersing the aqueous mixture in an attrition type colloid mill, a suspension of the fine crystal of chloramphenicol palmitate having the size of less than 0.5 microns was obtained.

EXAMPLE 4

A mixture of 50.0g of chloramphenicol palmitate and 4.0g of polyoxyethylene ($n = 20$) sorbitan stearate was melted and the molten mixture was added to 1 liter of water cooled to 3° - 0°C with stirring. After heating the aqueous mixture to 40°C, the mixture was dispersed by means of an attrition type colloid mill to provide a suspension of the fine crystals of chloramphenicol palmitate having the size of less than 0.5 microns.

EXAMPLE 5

A mixture of 60.0g of chloramphenicol palmitate and 2.4g of polyoxyethylene ($n = 60$) hardened castor oil derivative and the molten mixture was added to 1 liter of water cooled to 3° -0°C with stirring. After heating the mixture of 40°C, the mixture was dispersed by means of an attrition type colloid mill to provide suspension of the fine crystals of chloramphenicol palmitate having the size of less than 0.5 microns.

EXAMPLE 6

A mixture of 60.0g of chloramphenicol palmitate and 3.5g of polyoxyethylene ($n = 20$) sorbitan monostearic acid ester was melted and the mixture was quenched to 5°C to provide a solid material, which was pulverized by means of a mortar and was added to 1 liter of water containing 400g of sucrose, 1.52g of p-hydroxybenzoic acid methyl ester, and 5g of sodium carboxy methyl cellulose. By dispersing the resultant mixture by means of an attrition type colloid mill, a suspension of the fine crystals of chloramphenicol palmitate having the size of less than 0.5 microns was obtained.

EXAMPLE 7

A mixture of 60.0g of chloramphenicol palmitate and 2.5g of polyoxyethylene ($n = 25$) stearic acid ester was melted and the molten mixture was added to 1 liter of water containing 300g of sucrose and 5g of sodium carboxymethyl cellulose cooled to 0° - 3°C. After heating the resultant mixture to 40°C, the mixture was dispersed by means of an attrition type colloid mill to provide a suspension of the fine crystals of chloramphenicol palmitate having the size of less than 0.5 microns.

EXAMPLE 8

A mixture of 50.0g of chloramphenicol palmitate and 3.0g of polyoxyethylene ($n = 60$) hardened castor oil was melted and the mixture was quenched to 5°C to provide a solid material, which was pulverized by means of a mortar and added to 1 liter of water containing 400g of sucrose. After heating the resultant mixture to 40°C, the mixture was dispersed by means of an attrition type colloid mill to provide a suspension of the fine crystals of chloramphenicol palmitate having the size of less than 0.5 microns.

What is claimed is:

1. A process for the preparation of a microcrystalline chloramphenicol palmitate suspension comprising mix-melting 100 parts of chloramphenicol palmitate and 3-10 parts by weight, based on said chloramphenicol palmitate, of a non-ionic surface active agent having an HLB value between 13.0 and 16.5 selected from the group consisting of a polyoxyethylene ($n=15-30$) higher fatty acid ($C_{12}-C_{18}$) ester, a polyoxyethylene ($n=10-25$) sorbitan higher fatty acid ($C_{12}-C_{18}$) ester, a polyoxyethylene ($n=10-20$) polyoxypropylene ($m=1-4$) higher alcohol ($C_{12}-C_{18}$) ether, a polyoxyethylene ($n=15-30$) alkyl ($C_8-C_{10}$) aryl ether, and a polyoxyethylene ($n=50-80$) hydrogenated castor oil, solidifying the molten mixture by cooling, dispersing the solidified mixture in a liquid suspension medium selected from the group consisting of water, an aqueous solution of sodium carboxymethyl cellulose and an aqueous solution of methyl cellulose, and reducing the particle size of the resulting crystalline chloramphenicol palmitate product to less than 0.5 microns.

2. The process as claimed in claim 1 wherein said suspension medium is water.

3. The process as claimed in claim 1 wherein said suspension medium is an aqueous solution of sodium carboxymethyl cellulose.

4. The process as claimed in claim 1 wherein said suspension medium is methyl cellulose.

5. The process according to claim 1 wherein the solidified mixture is dispersed in the suspension medium by heating to a temperature ranging between 30° and 70°C.

* * * * *